United States Patent [19]
Ise

[11] Patent Number: 6,142,671
[45] Date of Patent: Nov. 7, 2000

[54] LINEAR ROLLING MOTION GUIDE APPARATUS

[75] Inventor: Genjiro Ise, Tokyo-to, Japan

[73] Assignee: THK Co., Ltd., Tokyo-to, Japan

[21] Appl. No.: 09/371,857

[22] Filed: Aug. 11, 1999

[30] Foreign Application Priority Data

Aug. 18, 1998 [JP] Japan ................................. 10-232044

[51] Int. Cl.⁷ .................................................. F16C 29/06
[52] U.S. Cl. ............................................................ 384/45
[58] Field of Search ................................. 384/43, 44, 45, 384/49, 51

[56] References Cited

U.S. PATENT DOCUMENTS

| | | | |
|---|---|---|---|
| 4,693,040 | 9/1987 | Teramachi | 384/45 X |
| 4,934,834 | 6/1990 | Morita | 384/45 |
| 5,851,073 | 12/1998 | Takeuchi | 384/45 |
| 5,951,168 | 9/1999 | Teramachi et al. | 384/45 |
| 5,993,064 | 11/1999 | Teramachi et al. | 384/43 |

Primary Examiner—Thomas R. Hannon
Attorney, Agent, or Firm—Young & Thompson

[57] ABSTRACT

A linear rolling motion guide apparatus comprises a track member as a guide rail formed with a track extending in a longitudinal direction thereof, a movable member as a movable block formed with a rolling member circulation passage including a loaded rolling member rolling track corresponding, in position, to the track of the track member, a number of rolling members such as balls rolling in the rolling member circulation passage, the movable member being arranged to be movable relatively to the track member by a rolling motion of the rolling member and a rolling member connection assembly, as a retainer, mounted to the movable member, the rolling member connection assembly having a flexible belt-shaped member supporting the rolling members in series to be rotatable. The movable member is formed with a single material and the movable member is integrally formed with guide portions, for guiding the flexible belt-shaped member, to both sides of the loaded rolling member rolling track with the same material as that of the movable member through the same manufacturing process therefor.

13 Claims, 8 Drawing Sheets

LINEAR ROLLING MOTION GUIDE APPARATUS

BACKGROUND OF THE INVENTION

The present invention relates to a linear rolling motion guide apparatus particularly provided with a connection belt assembly for supporting rolling members continuously in series.

In a known linear rolling motion guide apparatus, a movable block (movable member) and a track rail (track member) are assembled to be relatively movable by a number of rolling members such as balls. The track rail is formed, along a longitudinal direction thereof, with a track along which the rolling members are rolled, and the movable block is formed with a rolling member circulation passage including a loaded track opposing (corresponding) to the track of the track rail when assembled. The rolling members are accommodated in an arranged state in the rolling member circulation passage and rolled on the track rail and circulated in the circulation passage, while being loaded load, in accordance with the relative motion between the track rail and the movable block.

With the known linear motion guide apparatus mentioned above, there is also provided a structure in which the rolling members are supported or held in series by a belt member having flexibility. According to such support structure, the generation of noises and abrasion which may be caused through the friction of adjacent rolling members can be prevented and the coming-off of the rolling members at a time of removing the movable block from the track rail can be also prevented.

The movable member is provided with linear guide portions along the loaded track for guiding side edge portions of the belt member projecting on both sides of the rolling members, and such guide portions are formed of a steel plate, for example, as a member independent from the movable block. Furthermore, a portion of the movable block to which the load is applied is formed of a metal material having a large mechanical strength and a portion to which any load is not applied is formed of a synthetic resin material. In such structure, the guide portion for guiding the belt member is formed of a synthetic resin (which may be called hereinlater merely resin) integrally with the movable block.

However, the fact that the guide portion is formed of the steel plate other than the material forming the movable block requires many parts or members and also requires another working for fastening the guide portions to the movable block by means of screws or the like after the formation of the movable block. Furthermore, it is troublesome and difficult to fasten the guide portions to the movable block by means of screws at a small space between the movable block and the track rail.

Incidentally, in the structure in which the resin guide portion is integrally formed with a resin portion of the movable block, there is required another working step for integrally molding the guide portions with the resin to a movable block body made of metal after the metal movable block body has been formed. Moreover, since the movable block is thus formed with the resin portion, it is inconvenient to use such movable block in a high temperature atmosphere or vacuum environment.

SUMMARY OF THE INVENTION

An object of the present invention is to substantially eliminate defects or drawbacks encountered in the prior art mentioned above and to provide a linear rolling motion guide apparatus with reduced components or parts and reduced assembling workings at a time of forming a guide portion for guiding a flexible belt member to a movable block (movable member).

This and other objects can be achieved according to the present invention by providing a linear rolling motion guide apparatus comprising:

a track member formed with a track extending in a longitudinal direction thereof;

a movable member formed with a rolling member circulation passage including a loaded rolling member rolling track corresponding, in position, to the track of the track member;

a number of rolling members, such as balls or rollers, rolling in the rolling member circulation passage, the movable member being arranged to be movable relatively to the track member by a rolling motion of the rolling members; and a rolling member connection assembly mounted to the movable member, the rolling member connection assembly having a flexible belt-shaped member supporting the rolling members in series to be rotatable, the movable member being formed with a single material and the movable member being integrally formed with guide portions, for guiding the flexible belt-shaped member, to both sides of the loaded rolling member rolling track with the same material as that of the movable member through the same manufacturing process therefor.

In preferred embodiments of the above aspect, the movable member is formed by injection molding a mixture material of metal powder and synthetic material, removing the synthetic material thereafter through a heat treatment or chemical treatment and then sintering the material.

The rolling member circulation passage includes a rolling member return passage arranged substantially in parallel to the loaded rolling member rolling passage, the rolling member return passage being formed with a guide groove, for guiding the flexible belt-shaped member, integrally to the movable member through the same manufacturing process therefor.

The rolling member circulation passage includes a pair of rolling member rolling direction changing passages connecting the loaded rolling member rolling track and the rolling member return passage, each of the rolling member rolling direction changing passage includes an inner peripheral portion and an outer peripheral portion, the inner peripheral portion being formed of the same material as that of the movable member through the same manufacturing process therefor, the outer peripheral portion being formed with a body different from that of the movable member, and when the inner peripheral portions and the outer peripheral portions of a pair of rolling member rolling direction changing passage are mated with each other, a guide groove for guiding the belt-shaped member is formed to the rolling member return passage.

The linear rolling motion guide apparatus further comprises a pair of end plates disposed at both longitudinal end portions of the movable member and the end plates constitute the outer peripheral portions of the rolling member rolling direction changing passages. The outer peripheral portion is formed by injection molding a mixture material of metal powder and synthetic material, removing the synthetic material thereafter through a heat treatment or chemical treatment and then sintering the material.

The flexible belt-shaped member is formed of a metal such as thin sheet of stainless steel plate.

The loaded rolling member rolling track is ground by means of a grinder through a space between the guide portions formed to both the side portions of the loaded rolling member rolling track.

More in detail, the track member is a guide rail having substantially a rectangular cross section and the movable member is a movable block having two leg portions so as to provide substantially a ⊐-shaped cross section, the guide rail being arranged between the leg portions so that said track formed to the guide rail accords, in position, with the loaded rolling member rolling track formed to the movable block.

The flexible belt-shaped member is a retainer composed of a belt-shaped plate and a number of holes which are arranged with equal interval with each other and in which the rolling member is held to be rotatable and side edge portions of the belt-shaped plate are guided by the guide portions when the retainer is assembled with the movable member.

According to the characteristic features of the present invention mentioned above, since the movable member and the guide portions are formed of the same material such as metal and synthetic resin at the same time for carrying out an injection molding process or casting process, constructional parts or elements and assembling steps can be effectively reduced for manufacturing the linear rolling motion guide apparatus.

Furthermore, when the movable member is formed through a metal injection molding process, the movable member can be formed with fine and complicated structure, as well as the guide portions. In such case, the guide portions are also formed of the metal material, and accordingly, even if the guide portion is formed in thin shape between the movable member and the track member, the guide portions can provide sufficient strength. In addition, in a prior art including a case in which a resin part is formed integrally with a metal movable member, burr may be caused between the movable member and the resin part. However, according to the present invention in which the guide portions and the movable member are formed integrally through the injection molding process, such burr is not caused.

Still furthermore, according to the present invention, since the guide groove is formed integrally with the rolling member return passage, the number of parts or elements and assembling steps can be effectively reduced. Moreover, the side edge portions of the flexible belt-shaped member as retainer are guided by the guide groove of the rolling member return passage, so that the vibration of the flexible belt-shaped member can be effectively suppressed, thus the predetermined track being properly and stably maintained, and the rolling members such as balls can also be stably rolled on the predetermined track.

Still furthermore, since the inner peripheral portion of the rolling member rolling direction changing passage is integrally formed with the movable member, the number of parts or elements and assembling steps can be effectively reduced. Furthermore, in the rolling member rolling direction changing passage, the flexible belt-shaped member is guided by the guide groove, so that the vibration of the flexible belt-shaped member in this passage can be also effectively suppressed, thus the predetermined track being properly and stably maintained, and the rolling members such as balls supported by the flexible belt-shaped member can also be stably rolled on the predetermined track.

Still furthermore, according to the present invention, all the parts or members constituting the linear rolling motion guide apparatus can be formed of metal material, so that the apparatus can be used in a high temperature condition and a vacuum condition in which an apparatus formed of resin parts such as in the prior art is not used.

Still furthermore, the loaded rolling member rolling track can be ground between the guide portions by coinciding the contact angle direction of the rolling members with the cutting direction of the grinding member even in a case where the guide portions are integrally formed with the loaded rolling member rolling track, so that the surface thereof can be smoothly ground, resulting in the smooth circulation of the rolling members such as balls.

The nature and further characteristic features of the present invention will be made more clear from the following descriptions made with reference to the accompanying drawings.

BRIEF DESCRIPTION OF THE DRAWINGS

In the accompanying drawings:

FIG. 4 shows a retainer and a plurality of balls of the linear motion guide apparatus of FIG. 1 and includes FIG. 4A of a side view, FIG. 4B of a plan view and FIG. 4C of a front view;

DESCRIPTION OF THE PREFERRED EMBODIMENT

Figure 1:
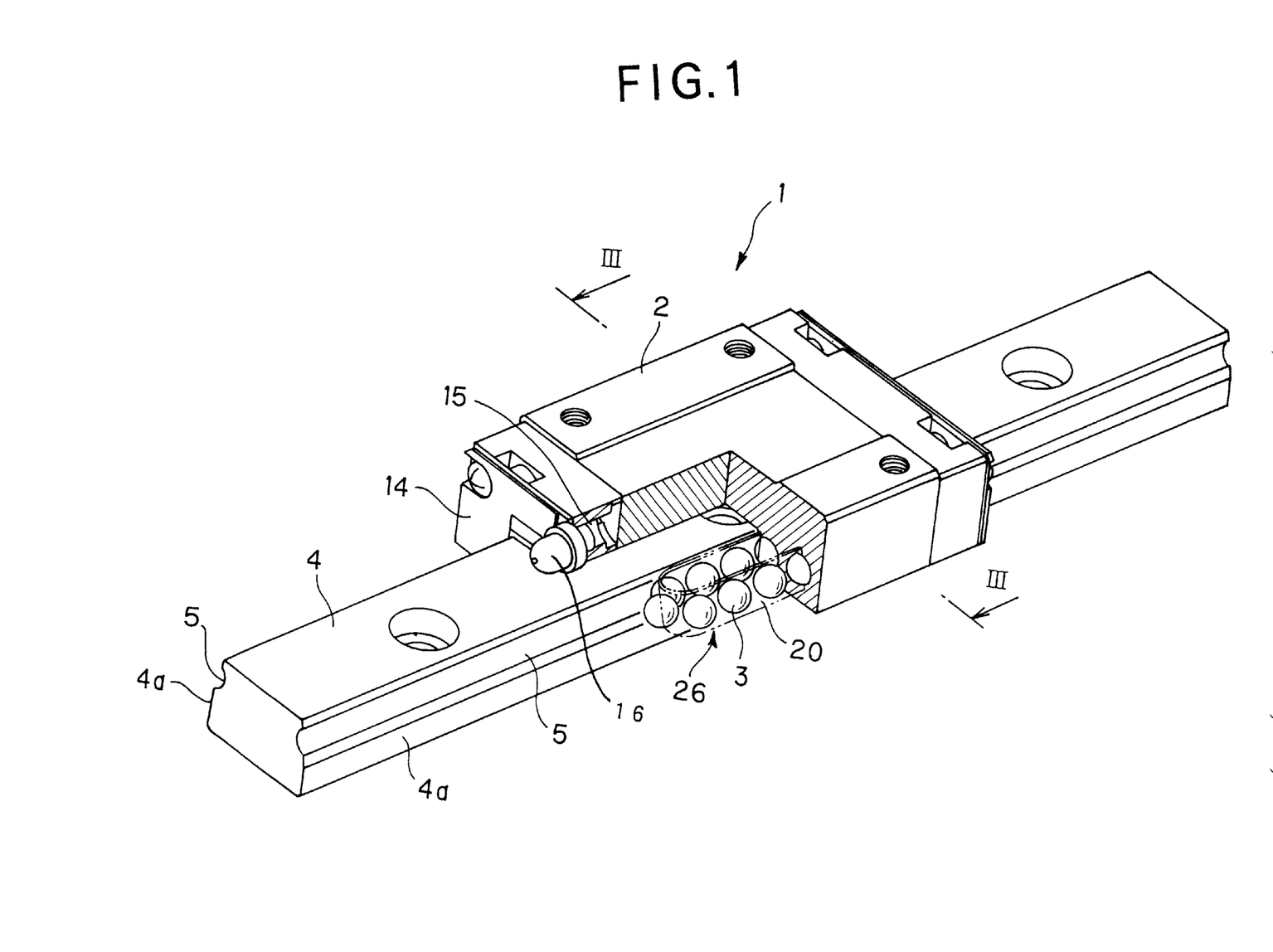
FIG. 1 is a perspective view of a linear rolling motion guide apparatus according to one embodiment of the present invention.

With reference to FIG. 1 showing a perspective view of a linear rolling motion guide apparatus 1 of the present invention, a movable block 2 as movable member is supported by a guide rail 4 as track member by a number of rolling members 3, 3, - - -, 3, i.e. balls in this embodiment so that the movable block 2 is linearly movable along the guide rail 4. It is to be noted that, in a modified example, the movable block 2 may be formed as stationary side and the guide rail 4 may formed as movable side.

The guide rail 4 has an elongated structure and has substantially a rectangular cross section and has both lateral side surfaces to which a pair of ball rolling grooves 5, as tracks for rolling the balls 3, 3, - - -, 3, are formed along the entire longitudinal lengths thereof.

Figure 2:
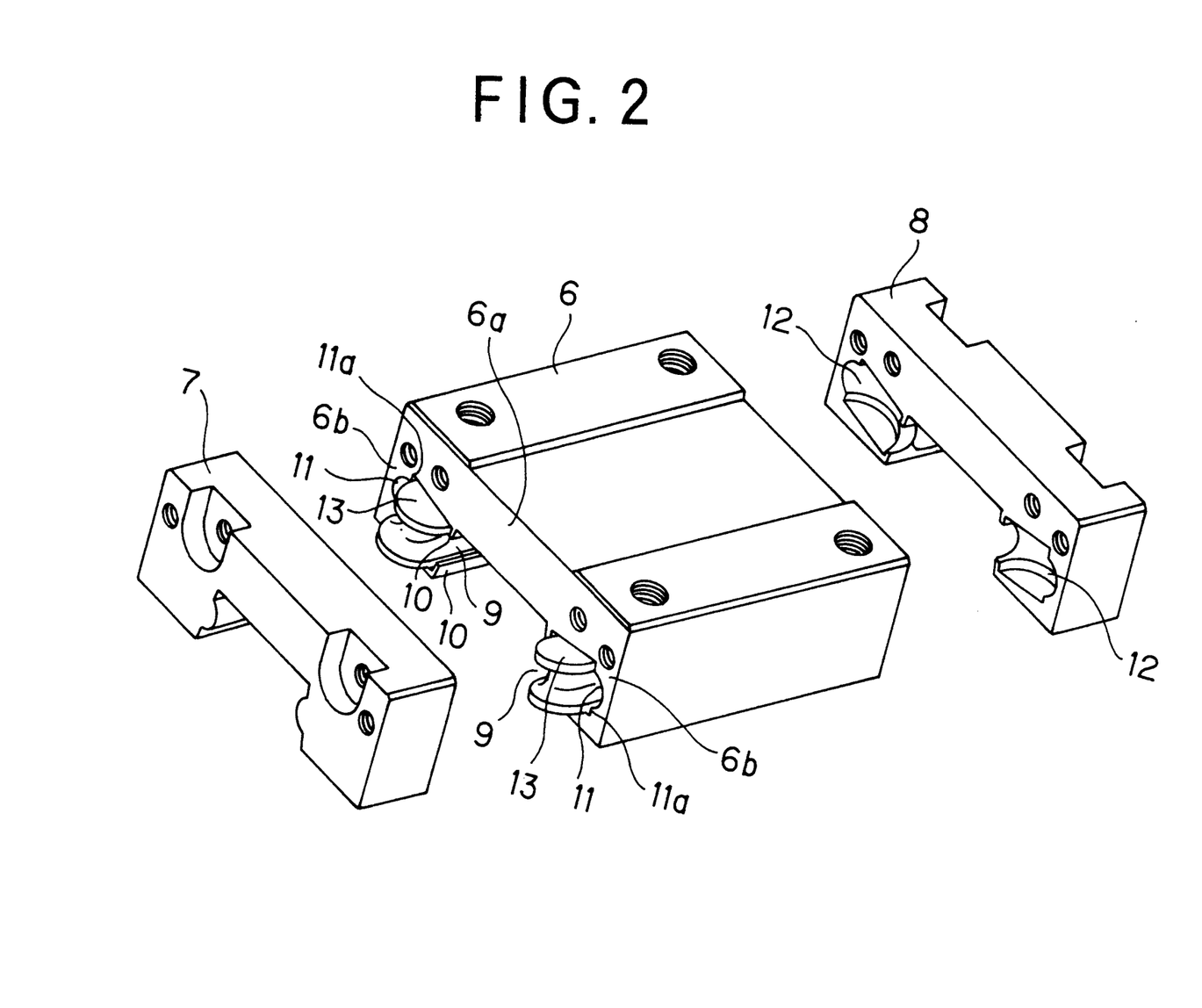
FIG. 2 is a developed perspective view showing a movable block body and end plates of the linear rolling motion guide apparatus of FIG. 1.
Figure 3:
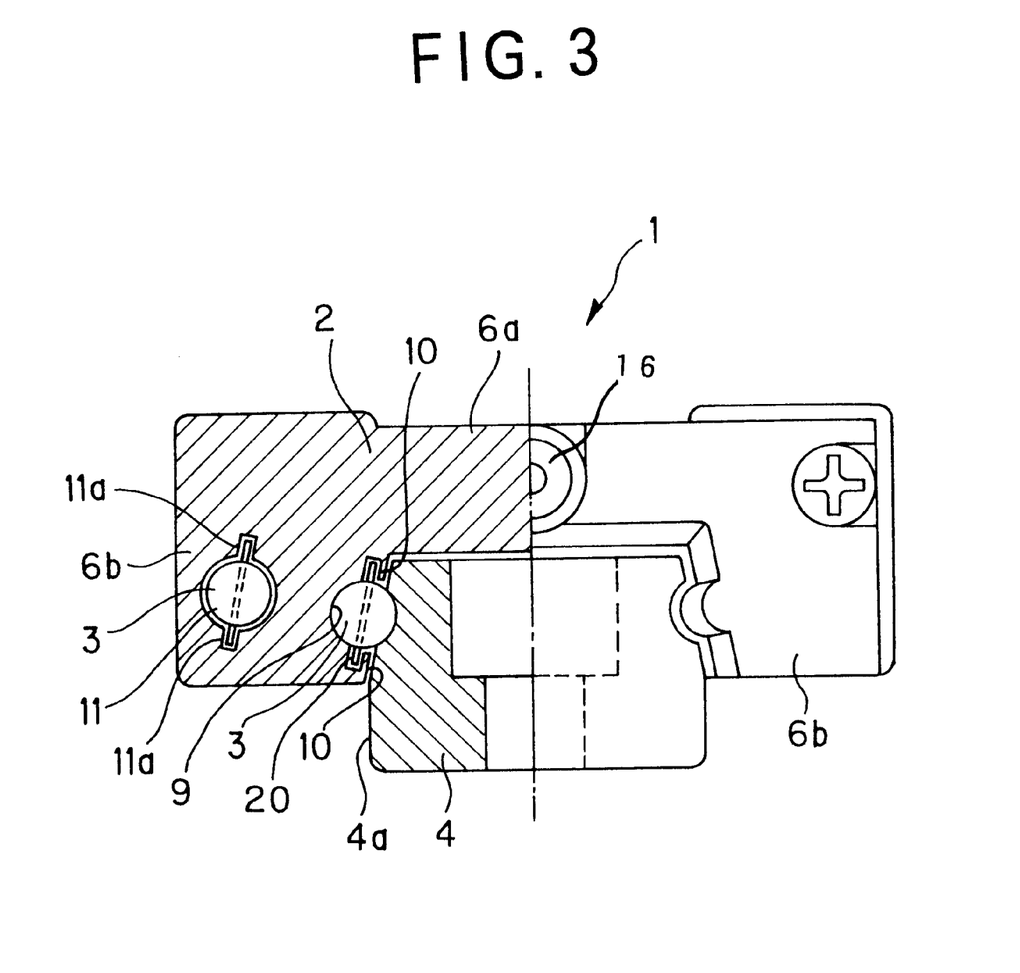
FIG. 3 is a sectional view taken along the line III—III of FIG. 1.

The movable block 2 is composed, as shown in FIG. 2, of a movable block body 6 and end plates 7 and 8 mounted to both longitudinal ends of the movable block body 6. The movable block body 6 has substantially a gate (⊐)-shaped cross section and provided with a horizontal portion 6*a* opposing to an upper surface of the guide rail 4 and a pair of leg portions 6*b*, 6*b* opposing to the lateral side surfaces 4a, 4a of the guide rail 4, when the guide rail 4 is arranged in the ⊐-shaped space of the movable block body 6. The paired leg portions 6b, 6b are formed, at inside surfaces thereof, with loaded ball rolling grooves 9, 9 as loaded tracks corresponding to ball rolling grooves 5, 5 formed to the side surfaces 4a, 4a of the guide rail 4. Guide portions 10, 10 are formed to both side portions of the loaded ball rolling groove 9 linearly along the groove 9, and the guide portions 10, 10 are formed of the same material as that of the movable block body through the same manufacturing process therefor at a same time of forming the movable block body. The guide portions 10, 10 are formed with thin thickness, as shown in FIG. 3, in spaces between the inside surfaces of the leg portions 6a, 6a and the side surfaces 4a, 4a of the guide rail 4, respectively. According to the formation of these guide portions 10, 10, guide grooves for guiding the side edge portions of retainers 20, formed as flexible belt members, for supporting the balls 3, 3, - - -, 3 in series to be rotatable, are formed to both the side portions of the loaded ball rolling grooves 9, 9, respectively. Such connected arrangement of the balls 3, 3, - - -, 3 and the retainer 20 will be called "rolling member connection belt assembly 26" hereinlater.

Furthermore, each of the paired leg portions 6b, 6b is formed with a ball return passage 11 as a rolling member return passage to be substantially parallel to the loaded ball rolling groove 9 and adapted to return the balls from one end of the loaded ball rolling groove 9 to the other end thereof through the ball return passage 11. The ball return passage 11 has an inner diameter slightly larger than a diameter of the ball 3. The ball return passage 11 is also formed integrally with a guide groove 11a for guiding the side edge portion of the retainer 20 in the manner substantially the same as that mentioned with respect to the movable block body 6.

With reference to FIG. 2, each of the end plates 7 and 8 has a gate (⊐)-shaped cross section as like as the sectional shape of the movable block body 6. The end plate 7 (8) is formed with an outer peripheral portion 12 of a ball rolling direction changing passage for scooping the balls 3 rolling in the loaded ball rolling groove 9 to guide the balls 3 to the ball return passage 11 and, reversely, for again guiding the balls 3 from the ball return passage 11 to the loaded ball rolling groove 9. The movable block body 6 is formed, at both the longitudinal end portions, with rounded pieces (R-pieces) 13 formed as inner peripheral portions constituting the ball rolling direction changing passages. The end plate 7 (8) is formed with a body different from that of the movable block body 6.

When the end plates 7 and 8 are mounted correctly in positions to the movable block body 6, the rounded pieces 13 and the outer peripheral portions 12 constitute, in combination, the ball rolling direction changing passages at both the longitudinal end portions of the movable block 2 and guide grooves for guiding the side edge portions of the retainers 20 can be formed as like as the formation of the ball return passage 11.

The ball rolling direction changing passages, the loaded ball rolling grooves 9 and the ball return passages 11 are called in combination "rolling member circulation passage".

The movable block body 6 and the end plates 7 and 8 are formed with single material or substance through a metal injection molding (MIM) process. This MIM process includes the steps of injection molding a mixture composed of metal powder and synthetic material (mainly in fine grain or particle form), removing the synthetic material component through a thermal treatment or chemical treatment and performing a sintering treatment.

That is, in the first step, a binder composed of fine synthetic material particles is added to the metal powder, kneading the mixture of the binder and the metal powder into pellet and then injection molding the pellet by using a known injection molding machine. In this step, there is utilized fine metal powder, as starting material, consisting of metal element of C, Si, Mn, Cr, Mo, W, V, Ti, Fe or the like having a powder (particle) diameter of about 10 μm. Further, the "single material" mentioned above means only one kind of these metal elements and also means an alloy of these metal elements, and a polyethylene or the like may be used as the binder.

In the next step, the injection molded product is heat treated in a furnace to vaporize the binder component and then remove the same through thermal treatment or chemical treatment. Thereafter, the metal body is preliminarily sintered thereby to obtain a molded part having a sufficient stability. In a subsequent sintering step, a molded product having a high relative density nearly of 100%.

According to the adoption of such metal injection molding (MIM) process, a product having fine and complicated composition or structure can be manufactured without performing any cutting working. Thus, according to such MIM process, the guide portions 10 having fine and complicated structure can be simultaneously formed integrally with the movable block body 6. Therefore, it becomes not necessary to form the guide portions 10 separately from the movable block body 6, and hence, the assembling working and the number of constituent components can be effectively reduced. Furthermore, an adequate mechanical strength of the product can be obtained by increasing the relative density of the metal injection mold product, so that the guide portion 10 can maintain adequate strength even if it be formed with thin thickness in a narrow space between the movable block body 6 and the guide rail 4.

Furthermore, through the MIM process mentioned above, the fine guide grooves 11a can be formed to the ball return passages 11 of the movable block body 6, and the end plates 7 and 8 having a complicated structure, with the outer peripheral portions 12 of the ball rolling direction changing passages being formed, can be also formed. Still furthermore, the guide grooves for guiding the side edge portions 20a of the retainer 20 can be also formed to the ball rolling direction changing passages constituted by the end plates 7 and 8 and the rounded pieces (R-pieces) 13, 13.

As can be seen from FIG. 2, threaded portions for screw engagement are formed to the end surfaces of the movable block body 6 for fastening the end plates 7 and 8 to the movable block body 6, and threaded portions for screw engagement are also formed to the upper surface of the movable block body 6 for securing a material mounted thereon. The end plates 7 and 8 are formed with holes into which fastening screws are engaged for securely mounting the end plates to the movable block body and holes into which fastening screws are engaged for fixing end face seals 14 (FIG. 1) for preventing dust or dirt from entering into the end plates 7 and 8. Furthermore, as shown in FIG. 1, the end plate 7 is formed with a lubricant passage 15 extending towards the ball rolling direction changing passage, and a grease nipple 16 is fitted to the lubricant passage 15.

Figure 4A:
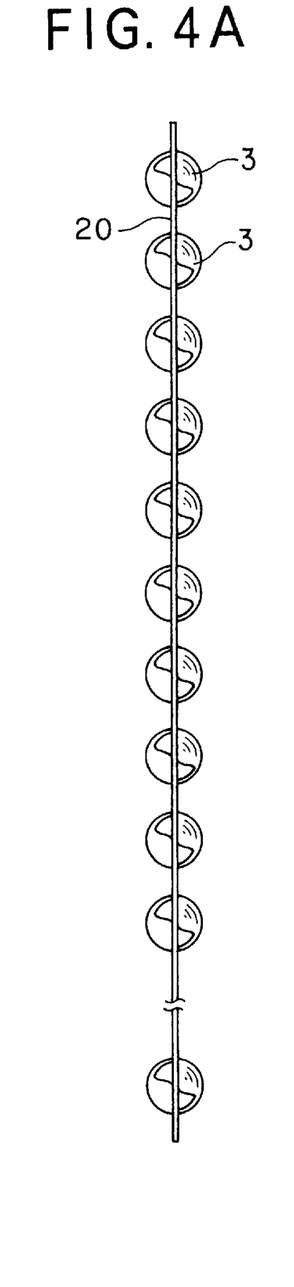
Figure 4B:
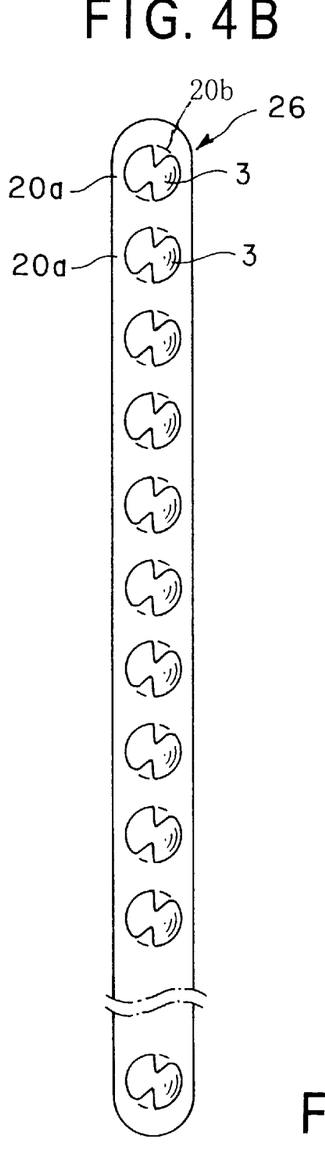
Figure 4C:
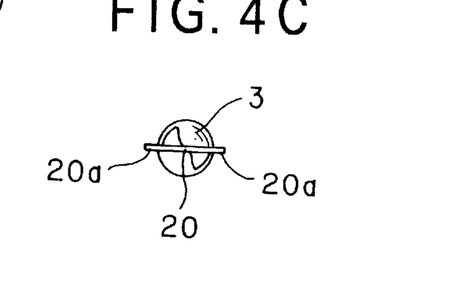

A number of balls 3 are held continuously by a retainer 20 having a flexibility and formed in shape of belt as shown in FIG. 4. The retainer 20 is formed with a number of ball holes 20b with equal interval from each other and the balls 3 are held in the ball holes 20a, respectively, to be rotatable. The retainer 20 is also formed with side edge portions 20a on both width sides thereof. Furthermore, the longitudinal ends of the retainer 20 is formed so as to provide round end portions so that the retainer 20 can be easily and smoothly inserted into the movable block 2. The retainer 20 is preferably formed of a stainless steel plate in shape of belt having an elastic or flexible property.

Figure 5:
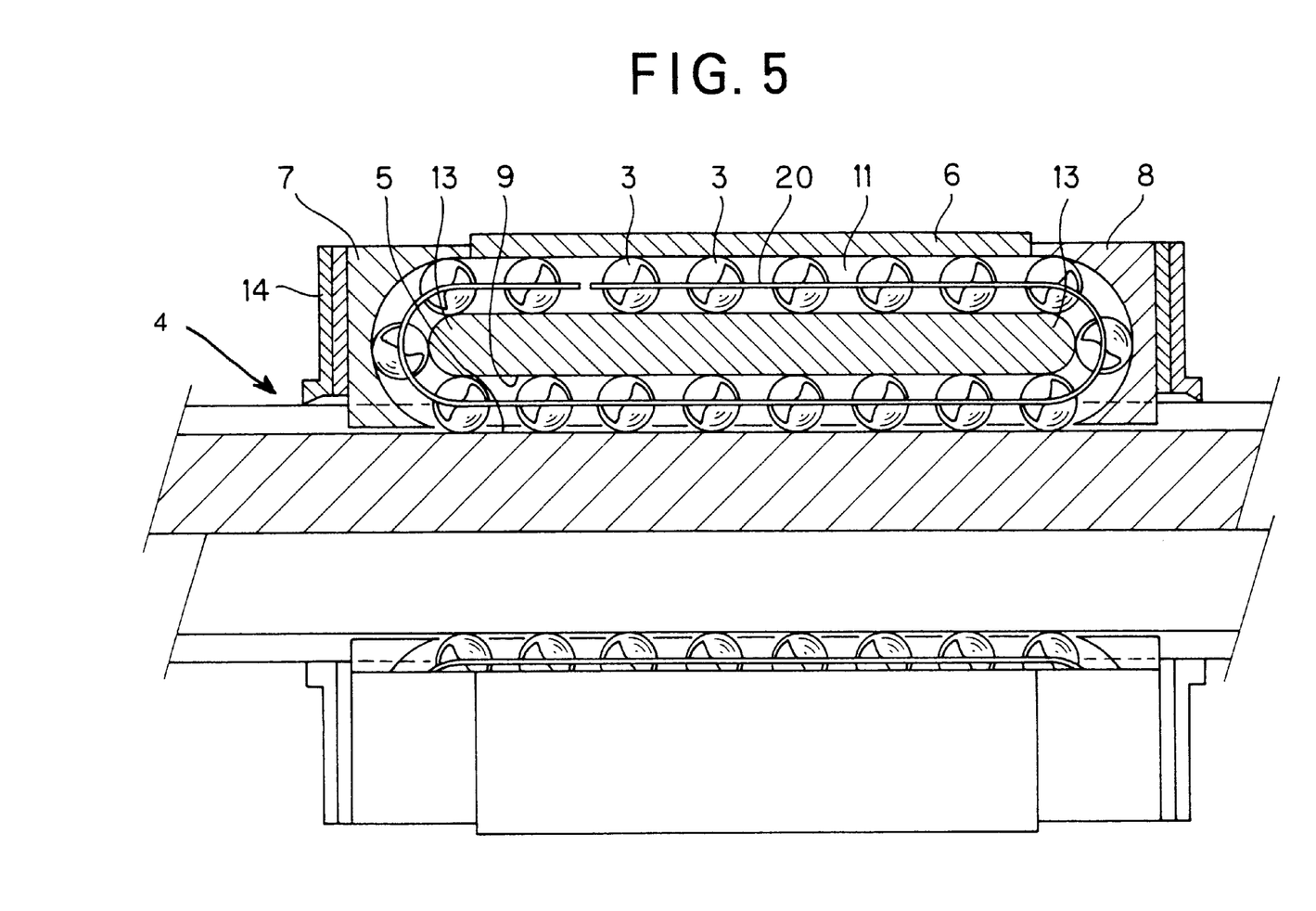
FIG. 5 is a bottom view including a half-sectional portion of the structure shown in FIG. 1.

FIG. 5 shows a state of the balls 3 rolling between the loaded ball rolling groove 5 and the ball rolling groove 5 as the loaded area and between the ball return passage 11 and the ball rolling direction changing passage as the non-loaded area. According to the arrangement in which a number of balls 3 are held continuously in series by the retainer 20, noises and abrasion of the balls 3 caused by the mutual friction of the balls 3 can be prevented. Furthermore, in the absence of the retainer, resistance, which is applied to the balls 3 at the time when the balls 3 moves from the non-loaded area to the loaded area, is increased and, hence, the smooth ball rolling motion is obstructed by such resistance. However, according to the location of the retainer 20, the balls 3 can be smoothly taken into the loaded area and, hence, smoothly moved from the non-loaded area to the loaded area. Still furthermore, the side edge portions 20a of the retainer 20 can be guided in the entire length thereof by the guide portion 10 formed along the loaded ball rolling groove of the movable block 6, the guide groove formed to the ball rolling direction changing passage and the guide groove 11a formed to the ball return passage 11, so that the vibration of the entire structure of the retainer 20 at the time of the ball circulation can be restricted. Therefore, the retainer 20 can be moved on a predetermined track throughout the entire periphery of the endless circulation passage, and hence, the balls 3 held by the retainer 20 can be also moved on the predetermined track.

As mentioned above, according to the present invention, parts or elements, including the retainer, constituting the linear rolling motion guide apparatus can be formed of metal materials, so that the linear rolling motion apparatus thus manufactured can be used in an environment of a temperature of more than 80° C. in which a conventional linear rolling motion guide apparatus formed of materials including resin can not be used. Furthermore, in a prior art, when the linear rolling motion guide apparatus is used in a vacuum environment, gas is generated from the resin material part and, hence, the vacuum condition cannot be kept. However, according to the metal structure of the present invention, the gas cannot be generated and, hence, it becomes possible to use the linear rolling motion guide apparatus in the vacuum condition. Further, it is preferred to use a solid lubricant in the use at a high temperature environment.

Figure 6:
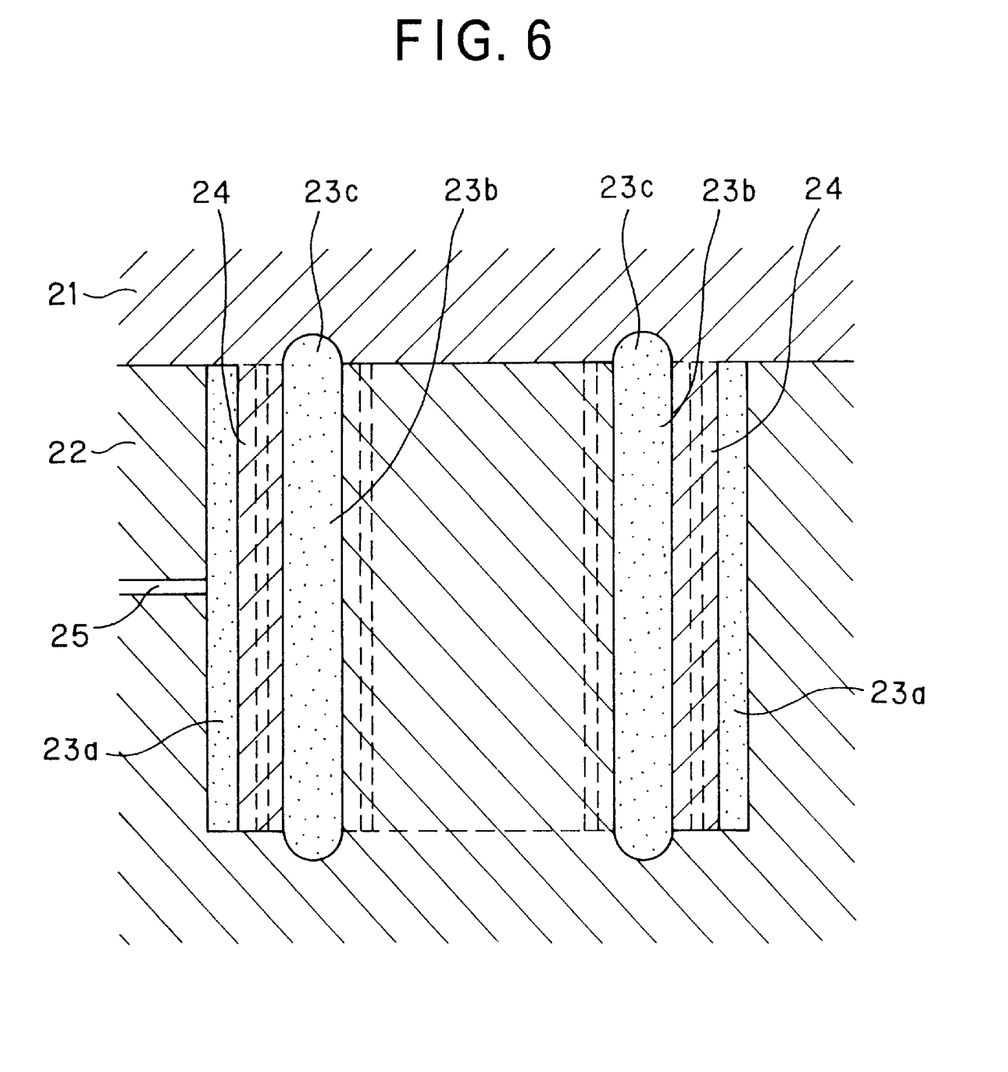
FIG. 6 is a partial view showing one example of a movable block forming mold.
Figure 7:
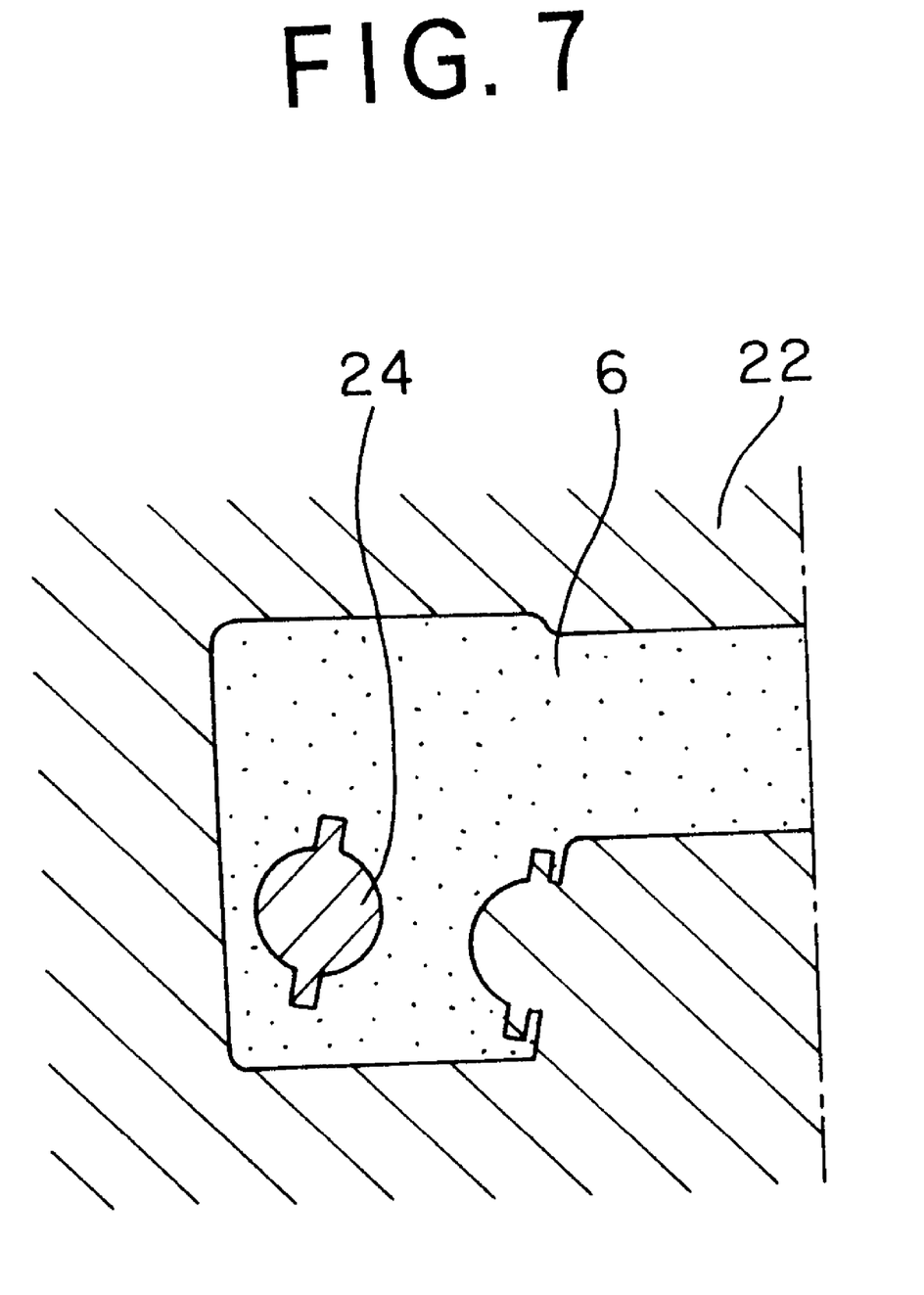
FIG. 7 is a sectional view of FIG. 6.

FIGS. 6 and 7 show schematic views of a mold for molding the movable block 6 according to the present invention.

With reference to FIG. 6, the mold is composed of an upper mold half 21 and a lower mold half 22 between which cavities are defined for forming the movable block 6. The cavities are formed on both the lateral sides of the lower mold half 22 and each of the cavities includes a cavity portion 23a for forming an outside portion of a leg portion 6b of the movable block 6, a cavity portion 23b for forming an inside portion of the leg portion 6b, the loaded ball rolling groove 9 thereof and the guide portion 10, and a cavity portion 23c for forming the round (R) piece portions 13 to the front end rear portions of the leg portion 6b. On the other hand, the upper mold half 21 is formed with a pin 24 for forming the ball return passage 11. The lower mold half 22 is also formed with a gate 25 communicating with the cavity portion 23a. According to such structure, the pellet formed by kneading the metal powder and the synthetic material-rinjected into the cavities 23a, 23b and 23c through the gate 25.

Figure 8:
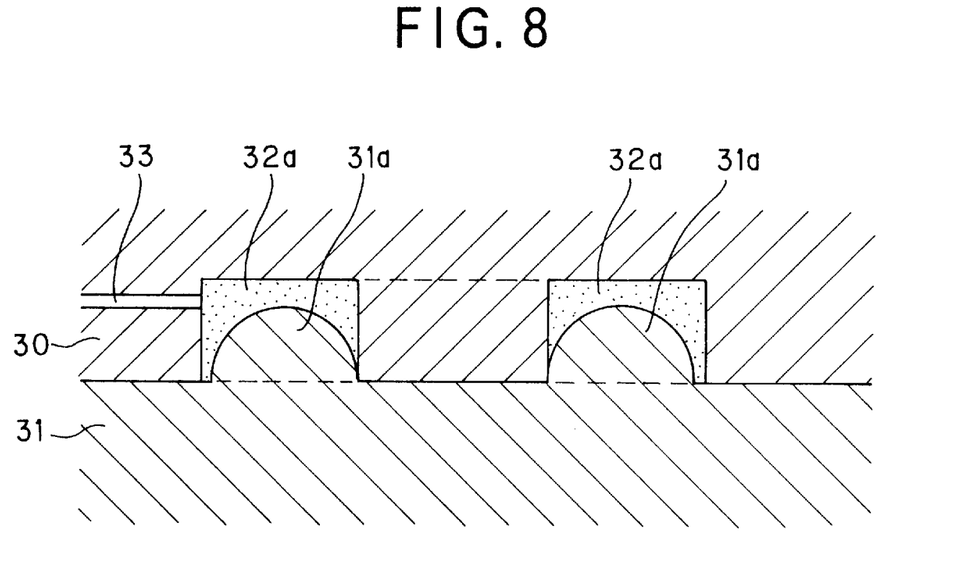
FIG. 8 is a partial view showing one example of an end plate forming mold.

FIG. 8 shows a schematic view of a mold for molding the end plates 7 and 8, and the mold is composed of an upper mold half 30 and a lower mold half 31 between which cavities 32a for molding leg portions of the end plates 7 and 8 are formed. The lower mold half 31 is formed with circular (arcuate) projections 31a for forming outer peripheral portions 12 of the ball rolling direction changing passages. The upper mold half 30 is formed with a gate 33 communicating with the cavity 32a, and the metal powder is injected into the cavity 32a through the gate 33.

Figure 9:
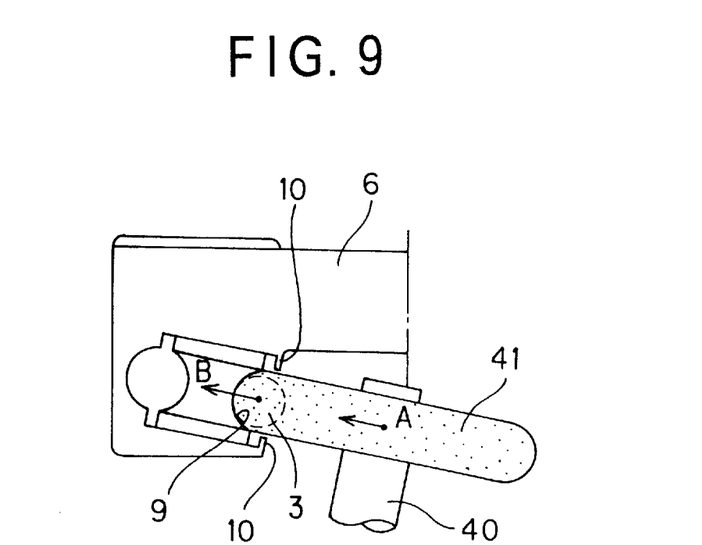
FIG. 9 is a schematic view showing a loaded rolling groove grinding working.

FIG. 9 is a view for showing a grinding operation for grinding the loaded ball rolling groove 9, which is ground by an outer peripheral portion of a grinding wheel 41, in shape of disc, fixed to the front end of a rotation shaft 40. According to the present invention, the loaded ball rolling groove 9 can be ground through the guide portions 10 formed on both sides of the groove 9.

In a circular arc structure in which the loaded ball rolling groove 9 is formed in a single arcuate shape, the grinding working is performed by making approximately coincide a cutting direction (direction A in FIG. 9) of the grinding wheel 41 with the contact angle direction of the loaded ball rolling groove 9 (direction B in FIG. 9), the contact angle direction being a direction of a line connecting the center point of the ball 3 and a contact point of the ball 3 to the circular arc groove. On the other hand, in a Gothic arc structure in which the loaded ball rolling groove 9 is formed by two arcuate portions, a grinding wheel having two arcuate portions having outer peripheries corresponding to the shape of the Gothic arc groove, i.e. so-called, formed grinding wheel, will be utilized.

Further, it is to be noted that the present invention is not limited to the described embodiments and many other changes and modifications may be made without departing from the scopes of the appended claims.

For example, in the above embodiment, although the single row of balls is arranged on each side surface of the guide rail 4, the number of rows and arranging portions thereof can be optionally be changed in accordance with the magnitude or direction of load to be applied to the balls. Moreover, the guide rail 4 may have various shapes of cross section other than that mentioned hereinabove.

Furthermore, the track member 4 may be formed as a spline shaft and the movable member 2 may be formed as an outer cylinder which is movable with respect to the spline shaft through a number of rolling members such as balls or rollers.

What is claimed is:

1. A linear rolling motion guide apparatus comprising:
   a track member formed with a track extending in a longitudinal direction thereof;
   a movable member formed with a rolling member circulation passage including a loaded rolling member rolling track corresponding, in position, to said track;
   a number of rolling members rolling in the rolling member circulation passage, said movable member being arranged to be movable relatively to said track member by a rolling motion of the rolling members; and
   a rolling member connection assembly mounted to the movable member, said rolling member connection assembly having a flexible belt-shaped member supporting the rolling members in series to be rotatable, said movable member being integrally formed with guide portions, for guiding said flexible belt-shaped member, to both sides of the loaded rolling member rolling track with the same material as that of the movable member through the same manufacturing process therefor.

2. A linear rolling motion guide apparatus according to claim 1, said movable member is formed with a single material.

3. A linear rolling motion guide apparatus according to claim 1, wherein said movable member is formed by injection molding a mixture material of metal powder and synthetic material, removing the synthetic material thereafter through a heat treatment or chemical treatment and then sintering the material.

4. A linear rolling motion guide apparatus according to claim 1, wherein said rolling member circulation passage includes a rolling member return passage arranged substantially in parallel to the loaded rolling member rolling passage, said rolling member return passage being formed with a guide groove, for guiding said flexible belt-shaped member, integrally to the movable member through the same manufacturing process therefor.

5. A linear rolling motion guide apparatus according to claim 1, wherein said rolling member circulation passage includes a pair of rolling member rolling direction changing passages connecting said loaded rolling member rolling track and said rolling member return passage, each of said rolling member rolling direction changing passages includes an inner peripheral portion and an outer peripheral portion, said inner peripheral portion being formed of the same material as that of the movable member through the same manufacturing process therefor, said outer peripheral portion being formed with a body different from that of the movable member, and when the inner peripheral portions and the outer peripheral portions of a pair of rolling member rolling direction changing passage are mated with each other, a guide groove for guiding said belt-shaped member is formed to the rolling member return passage.

6. A linear rolling motion guide apparatus according to claim 5, further comprising a pair of end plates disposed at both longitudinal end portions of the movable member and said end plates constitute said outer peripheral portions of the rolling member rolling direction changing passages.

7. A linear rolling motion guide apparatus according to claim 5, wherein said outer peripheral portion is formed by injection molding a mixture material of metal powder and synthetic material, removing the synthetic material thereafter through a heat treatment or chemical treatment and then sintering the material.

8. A linear rolling motion guide apparatus according to claim 1, wherein said flexible belt-shaped member is formed of a metal material.

9. A linear rolling motion guide apparatus according to claim 8, wherein said flexible belt-shaped member is formed of a sheet of stainless steel plate.

10. A linear rolling motion guide apparatus according to claim 1, wherein said loaded rolling member rolling track is ground by means of a grinder through a space between said guide portions formed to both the side portions of the loaded rolling member rolling track.

11. A linear rolling motion guide apparatus according to claim 1, wherein said track member is a guide rail having substantially a rectangular cross section and said movable member is a movable block having two leg portions so as to provide substantially a gate (⊐)-shaped cross section, said guide rail being arranged between said leg portions so that said track formed to the guide rail accords in position with said loaded rolling member rolling track formed to the movable block.

12. A linear rolling motion guide apparatus according to claim 1, wherein said flexible belt-shaped member is a retainer composed of a belt-shaped plate and a number of holes which are arranged with equal interval with each other and in which the rolling member is held to be rotatable and side edge portions of said belt-shaped plate are guided by said guide portions when the retainer is assembled with the movable member.

13. A linear rolling motion guide apparatus according to claim 1, wherein said rolling members are balls.

* * * * *